United States Patent [19]

Auborn

[11] Patent Number: 4,476,204
[45] Date of Patent: Oct. 9, 1984

[54] ELECTROCHEMICAL CELL UTILIZING A MIXTURE OF PHOSPHORUS OXYCHLORIDE AND A LOW FREEZING SOLVENT AS THE ELECTROLYTE

[75] Inventor: James J. Auborn, Groton, Mass.

[73] Assignee: GTE Laboratories Incorporated, Waltham, Mass.

[21] Appl. No.: 305,811

[22] Filed: Nov. 13, 1972

[51] Int. Cl.$^3$ ............................................. H01M 6/14
[52] U.S. Cl. .................................. 429/196; 429/197; 429/199; 429/218
[58] Field of Search ................... 136/6 LN, 20, 83 R, 136/100 R, 154–155, 137; 429/194, 196, 197, 199, 218, 101, 105

[56] References Cited

U.S. PATENT DOCUMENTS

| | | | |
|---|---|---|---|
| 2,894,053 | 7/1959 | Louzos | 136/137 X |
| 3,043,896 | 7/1962 | Herbert et al. | 429/194 |
| 3,248,265 | 4/1966 | Herbert | 429/199 X |
| 3,415,687 | 10/1968 | Methlie | 429/199 X |
| 3,423,242 | 1/1969 | Meyers et al. | 429/194 |
| 3,493,433 | 2/1970 | Hoffmann | 429/196 |
| 3,508,966 | 4/1970 | Eisenberg | 429/199 X |
| 3,542,602 | 11/1970 | Gabano | 429/194 |
| 3,567,515 | 3/1971 | Maricle et al. | 429/105 |
| 3,578,500 | 5/1971 | Maricle et al. | 429/105 |
| 3,681,144 | 8/1972 | Dey et al. | 429/197 |
| 3,686,038 | 8/1972 | Garth | 429/197 |
| 4,400,453 | 8/1983 | Blomgren et al. | 429/196 |

Primary Examiner—Anthony Skapars
Attorney, Agent, or Firm—Robert E. Walrath

[57] ABSTRACT

An electrochemical cell having an alkali metal anode; a cathode selected from the group consisting of halogens, metal halides, Group VI A elements and compounds thereof with metallic elements; and an electrolyte containing an inorganic solvent system and a solute dissolved in the solvent system. The solvent system comprises a mixture of phosphorus oxychloride, and a low freezing solvent selected from the group consisting of thionyl chloride, thiophosphoryl chloride, sulfuryl chloride and monofluorophosphoryl dichloride.

22 Claims, No Drawings

ELECTROCHEMICAL CELL UTILIZING A MIXTURE OF PHOSPHORUS OXYCHLORIDE AND A LOW FREEZING SOLVENT AS THE ELECTROLYTE

BACKGROUND OF THE INVENTION

The invention herein described was made in the course of or under a contract or subcontract thereunder with the U.S. Government.

This invention relates to electrochemical cells. Most particularly, it relates to electrochemical cells utilizing a mixture of phosphorus oxychloride and a low freezing inorganic solvent as the electrolyte solvent system.

Modern technology has placed increased emphasis on producing an electrochemical power source having improved reliability, light weight, high power and long life. Power sources meeting these requirements find ready military applications in communications, submarines, torpedos and missile operations. In addition to its significance in defense, a light weight, high power, reliable power source would be of great value for use, for example, with portable radios, television sets, hearing aids, cameras or wrist watches.

Various high-voltage, high-energy density electrochemical cells have been the subject of recent investigation. Much of the work in this area has been involved with electrochemical cells having negative electrodes comprising highly reactive metals such as lithium.

Work on electrolytes for lithium-based electrochemical power sources has progressed generally along two major lines: high temperature molten salt electrolytes and organic solvent electrolytes. A cell which utilizes a molten salt electrolyte provides a chemically stable system in which strong oxidants such as chlorine can be used as cathodes. A cell utilizing a lithium anode and chlorine cathode provides exceptionally high energy and power density making development of a practical cell with these materials of particular interest. The molten salt lithium/chlorine cell (having a lithium anode, chlorine cathode and molten salt, typically lithium chloride, electrolyte) has many characteristics desirable in a high performance electrochemical cell. The anode is highly electropositive, and the cathode is highly electronegative. The equivalent weight of the reaction product is low and the anode, cathode and electrolyte conductivities are high. Nevertheless, these cells have severe problems. The temperature range of operation, which for the lithium chloride electrolyte is 450° C. to 650° C., necessitates heating systems and insulation that increase its cost, weight and complexity. To collect and store the chlorine evolved in rechargeable cells at these high temperatures, auxiliary systems are needed. In addition, there are few materials that can withstand for extended periods the attack of molten lithium, chlorine and molten lithium chloride at these temperatures; therefore the operating lifetime of these cells is relatively short, typically 20 to 30 minutes. The measured open circuit voltage, typically about 3.5 volts, is below the approximately 4 volts which is theoretically obtainable at 25° C.

In parallel with the development of lithium cells with molten salt electrolytes, lithium cells with nonhydroxylic organic solvents have been developed. These cells have been called "organic electrolyte cells" although typically they employ electrolytes consisting of inorganic salts in organic solvents. Cells of this type have the advantage of being operable at room temperature; however, chlorine itself and other strong oxidants cannot be used as a cathode with these solvents since the solvents are oxidized. Therefore, cells of this type will not provide an energy density as high as a lithium chlorine cell.

In application Ser. No. 131,530 filed Apr. 5, 1971, now abandoned, there is described an improved electrochemical cell having an anode selected from a specific group of materials, including the alkali metals, a halogen or metal halide cathode, and an electrolyte containing an inorganic solvent having the general formula $P_xO_{2x-1}Cl_{x+2}$ where x is an integer from 1 to 4 and a solute, selected from a wide range of materials, dissolved in the solvent.

In application Ser. No. 212,725 filed Dec. 27, 1971, now abandoned, there is described a further electrochemical cell having an alkali metal anode, a cathode selected from the group consisting of solid Group VI A elements and compounds of the Group VI A elements with metallic elements, and an electrolyte containing an inorganic solvent having the formula $P_xO_{2x-1}Cl_{x+2}$ (where x is as stated above) and a solute dissolved in the solvent.

The inorganic electrolyte solutions based on phosphorus oxychloride, as set forth in the aforementioned applications, are characterized by loss of electrical conductivity accompanying the phase transformation that occurs as the temperature of the electrolyte is lowered past the freezing point of phosphorus oxychloride (i.e.: about 2° C.). This freezing point is depressed less than 10° C. by the addition of the solute salts utilized to make electrolyte solutions electrically conducting. This phenomenon limits the use of batteries or fuel cells employing such electrolytes to operating temperatures above approximately 0° C. It would accordingly, be desirable to have an electrolyte which does not so limit the operating temperature at which such batteries or fuel cells, employing phosphorus oxychloride as at least one component of the electrolyte, can be utilized.

The present invention, therefore, is related to the inventions described in the aforementioned applications in that the same anodic, cathodic and solute materials can be utilized in the present invention; however, this invention relates to the use of such materials with a mixed solvent system which enables the electrochemical devices of this invention to be operated at lower operating temperatures.

SUMMARY OF THE INVENTION

This invention is directed to an electrochemical cell having an alkali metal anode, a cathode selected from the group consisting of halogens, metal halides, the Group VI A elements and compounds thereof with metallic elements, and an electrolyte containing an inorganic solvent system and a solute selected from a wide range of materials dissolved in the solvent system.

The electrolyte comprises a mixed inorganic solvent system and a solute dissolved in the mixed solvent system. The main component of the mixed solvent system is phosphorus oxychloride ($POCl_3$). The other component of the mixed solvent system is a low freezing solvent such as, for example, thionyl chloride ($SOCl_2$), thiophosphoryl chloride ($PSCl_3$), sulfuryl chloride ($SO_2Cl_2$), monofluorophosphoryl dichloride ($POFCl_2$), and the like. By low freezing solvent, as used in the application, it is meant a material which has a lower freezing point than $POCl_3$, dissolves the solute at least to a minor extent, and is sufficiently miscible with the $POCl_3$ to form a homogeneous electrolyte. In general, the low freezing component is used in an amount sufficient to give an electrolyte having the desired operating range; this usually will be from about 20% to about 80%, by weight, of the phosphorus oxychloride. The combination of solvents dissolves sufficient solute to the electrolyte formed thereby is sufficiently conducting to be utilized for the intended purpose, and has a sufficiently low freezing point so batteries or fuel cells utilizing such a solvent system can be operated at temperatures lower than about $-10°$ C. Since this mixed solvent system is non-reactive, cells can be constructed with a wide range of anode and cathode materials, particularly anode materials which themselves are highly reactive, such as lithium.

It is preferred that the solvent components be dried prior to use. In the case of phosphorus oxychloride this is accomplished by boiling this solvent with clean lithium shot for twelve hours at room temperature under an argon atmosphere. The phosphorus oxychloride is then distilled at atmospheric pressure and the material which boils between $105°$ C. and $106°$ C. is collected. The material thus prepared has a specific conductance of less than $7 \times 10^{-7}$ Mhos/cm. It is also preferred that a dried solute be used. The low freezing solvent component is dried in a similar manner.

The typical solute which is dissolved in the mixed solvent system provides at least one anion of the general formula $MX_4^-$, $M'X_6^-$, and $M''X_6^=$, where M is an element selected from the group consisting of phosphorus, arsenic and antimony; $M''$ is an element selected from the group consisting of tin, zirconium and titanium; and X is a halogen. Examples of suitable solutes yielding anions $MX_4^-$ are: tetrachloroaluminates $(AlCl_4^-)$, tetrabromoaluminates $(AlBr_4^-)$, tetrachloroborates $(BCl_4^-)$, and tetrafluoroborates $(BF_4^-)$. Examples of solutes yielding anions $M'X_6^-$ are: hexafluorophosphates $(PF_6^-)$. hexafluoroarsenates $(AsF_6^-)$, hexafluoroantimonates $(SbF_6^-)$ and hexachloroantimonates $(SbCl_6^-)$. Examples of solutes yielding anions $M''X_6^=$ are: hexachlorostannates $(SnCl_6^=)$, hexachlorozirconates $(ZrCl_6^=)$ and hexachlorotitanates $(TiCl_6^=)$. However solutes yielding a halogen anion, particularly chlorides $(Cl^-)$, bromides $(Br^-)$, and iodides $(I^-)$, and solutes providing one of the anions dichloroiodates $(ICl_2^-)$, dichlorophosphates $(PO_2Cl_2^-)$, bound adducts of dichlorophosphates and Lewis acids (such as $ZrCl_4$, $AlCl_3$, $BCl_3$, etc.), perchlorates $(ClO_4^-)$ and chlorosulfates $(SO_3Cl^-)$ are also contemplated within the scope of this invention.

The solute also provides at least one cation. This cation may be an alkali metal, especially lithium, sodium potassium, cesium, rubidium; an alkali earth metal, especially magnesium, calcium, strontium, and barium; or a lanthanide rare earth element, especially lanthanum, terbium, neodymium, cerium, europium and samarium. Cations having the following general formula $R_4N^+$ where R is a radical selected from the group consisting of methyl, ethyl, propyl, isopropyl, butyl, and isobutyl are also contemplated to be suitable for use in this invention. Examples of suitable cations are: tetramethylammonium $(CH_3)_4^+$, tetraethylammonium $(C_2H_5)_4N^+$, tetrapropylammonium $(C_3H_7)_4N^+$, and tetrabutylammonium $(C_4H_9)_4N^+$. These cations may be added as the tetraalkylammonium chloride, for example. Another cation contemplated within the scope of this invention is phosphorus oxydichloride $(POCl_2^+)$. The solute for a particular cell can be chosen to yield a combination of any of the anions and cations listed above, however, the electrolyte must contain at least $10^{-3}$ moles per liter of cation and at least $10^{-3}$ moles per liter of anion. Preferably, at least $10^{-1}$ moles per liter of cation and at least $10^{-1}$ moles per liter of anion are present.

Solutes having lithium cations and large anions which are stable to oxidation and reduction are particularly desirable. The preferred lithium solute compounds are: lithium tetrachloroaluminate, lithium tetrachloroborate, lithium tetrafluoroborate, lithium hexafluorophosphate, lithium hexafluoroarsenate, lithium hexafluoroantimonate, lithium hexachloroantimonate, lithium hexachlorostannate, lithium hexachlorozirconate, lithium hexachlorotitanate and lithium chlorosulfates. Other preferred compounds are Lewis acids; particularly aluminum chloride $(AlCl_3)$, boron fluoride $(BF_3)$, tin chloride $(SnCl_4)$, antimony chloride $(SbCl_5)$, antimony fluoride $(SbF_5)$, titanium chloride $(TiCl_4)$, aluminum bromide $(AlBr_3)$, phosphorus fluoride $(PF_5)$, phosphorus chloride $(PCl_5)$, arsenic fluoride $(AsF_5)$, arsenic chloride $(AsCl_5)$, zinc chloride $(ZnCl_2)$ and zirconium chloride $(ZrCl_4)$. In addition, Lewis bases having the general formula $A_mB_n$ where A is an element selected from the group consisting of lithium, sodium, potassium, rubidium, cesium, magnesium, calcium, strontium, barium and the rare earths and B is an element selected from fluorine, chlorine, bromine, iodine and oxygen are also useful. Included in this latter category are cesium chloride, rubidium chloride, and barium chloride.

The required anion and cation may be formed as a result of a chemical reaction directly with the solvent. For example, the Lewis acid $AlCl_3$ will react with the solvent component $POCl_3$ to yield the anion $AlCl_4^-$. The anion and cation may also be formed as a result of the reaction of a Lewis acid with a Lewis base dissolved in the solvent.

The anode is an active material and is preferably lithium metal. Other materials for anodes contemplated for use in this invention include sodium and potassium. The anode may be constructed of the active material in contact with a metal grid. The grid for a lithium anode, for example, may be made of nickel, nickel alloys (such as monel), stainless steel, silver and platinum.

Particular cathode materials suitable for use in the present invention are the halogens, such as chlorine, bromine and iodine; metal halides, such as nickel chloride, nickel fluoride, cobalt chlorides and fluorides, zinc chloride, zinc fluoride, cadmium chloride, cadmium fluoride, mercury chlorides, copper fluoride, copper chloride, silver chloride, silver fluorides, lead chloride, and bismuth fluoride; the solid Group VI A elements such as sulphur and selenium; and the solid compounds of the Group VI A elements with other metallic elements, such as the oxides, sulfides, and selenides, for example, cuprous oxide, cupric oxide, nickel oxide, lead dioxide, silver (I) oxide, silver (II) oxide, vanadium oxides, niobium oxides, tantalum oxide, manganese oxide, chromium trioxide, cuprous sulfide, cupric sulfide, nickel sulfide, etc. Of these particular materials, chlorine, chlorides, cupric sulfide, and nickel sulfide are the presently preferred cathode materials.

The cathode may be formed by mixing the particular material selected with a finely divided conductive material, such as carbon or graphite fibers, or small metal particles, such as silver particles, to render the mixture conductive. This is of particular interest with respect to the Group VI elements per se, such as pressed sulphur which preferably is made conductive by this technique. In addition, materials like polypropylene, polyethylene and polytetrafluoroethylene may be incorporated with the solid cathodic material to act as a binder.

As used throughout this specification and claims, when an electrochemical cell is designated to have a particular anode or cathode, or to be made of a particular anode or cathode material, that anode or cathode, or anode or cathode material, shall mean the electrochemically active component of the anode or cathode structure. The electrochemically active component may be in contact with or form a part of a suitable substrate which defines the anode or cathode structure.

A suitable separator can be employed to prevent the reaction of anode and cathode materials when no electric current flows through the external circuit. A separator prevents the diffusion of cathode material to the anode. When the cathode material is soluble in the electrolyte, an ion selective separator which allows only a particular ion or group of ions to migrate between the anode and cathode may be used. Two major groups of ion selective separators are organic permselective membrane and inorganic zeolites. A particularly useful membrane which permits the flow of lithium ions is perfluorinated hydrocarbon (membrane) sulphonate. If the cathode material is not soluble in the electrolyte, mechanical separators can be used. A wide variety of ceramic and plastic materials having small pore sizes are available. Examples of such materials include: alumina, beryllia, magnesia, zirconia, titania, porcelain, porous glass, fritted glass, nonwoven porous polytetrafluoroethylene and other fluorinated polymers, polypropylene and polyethylene.

DESCRIPTION OF SPECIFIC EMBODIMENTS

The following Examples are given to enable those skilled in the art to more clearly understand and practice the invention. They should not be considered as a limitation of the scope of the invention but merely as being illustrative and representative thereof.

In the following Examples, unless otherwise indicated, the electrochemical cell utilized in these Examples is of the following configuration:

The cathodes are constructed by pressing a blend of 80–90% of active material with 10–20% of conducting additive (usually graphite) and sufficient binder, generally polytetrafluoroethylene or polyethylene, onto an expanded copper or nickel screen in a heated square die 3.75 cm on each side at 2000 psig for 3 minutes. The cathode is then heat sealed in a nonwoven polypropylene envelope and dried in a vacuum oven before being transferred to an argon glove box for assembly into a cell. The anodes are constructed in the argon glove box by pressing expanded nickel screen onto 0.038 cm or 0.056 cm thick lithium foil. The anode is folded to envelope the cathode on both sides. The surface between the electrodes in these cells is 28 cm$^2$. The electrodes are placed in polyethylene or polytetrafluoroethylene rectangular cases of various sizes and adapted to contain from 8 to 25 ml. of electrolyte. Electrical properties of the cells are obtained with the cells in the argon glove box since the cells are not sealed, but only covered with a tight fitting cap.

Unless otherwise noted, the cells are discharged at 1 mA/cm$^2$ (28 mA), and energy density data, when given, excludes the weight of the case.

EXAMPLE I

The electrolyte is 0.8M LiCl and 1.0M BCl$_3$ in a 1:1 volume mixture of POCl$_3$ and SOCl$_2$. The cathode is a blend of 80% WO$_3$, 10% graphite, and 10% polytetrafluoroethylene on a nickel screen. The open circuit potential is 3.92 volts. Upon discharge, the voltage drops slowly from 3.35 volts to 3.0 volts in 1.75 hours, and then more rapidly from 3.0 volts to 0 volts in an additional 6.8 hours. Current density at 50% polarization is 24 mA/cm$^2$. Energy density to 0 volts is 46 watt-hours/lb.

EXAMPLE II

Example I is repeated except WO$_2$ is substituted for the WO$_3$. The open circuit potential is 3.78 volts. Upon discharge, the voltage drops slowly from 3.3 volts to 3.0 volts in 12.0 hours, then to 2.0 volts during an additional 5.0 hours, and then drops rapidly from 2.0 volts to 0 volts in an additional 3.0 hours. Current density at 50% polarization is 24 mA/cm$^2$. Energy density to 0 volts is 33.2 watt-hours/lb.

EXAMPLE III

Example I is repeated except HgS is substituted for the WO$_3$. Open circuit potential is 3.0 volts. Cell discharge at 1 mA/cm$^2$ lasted one hour.

EXAMPLE IV

Example I is repeated except Bi$_2$O$_3$ is substituted for the WO$_3$. Open circuit potential is 3.88 volts. Upon discharge, voltage drops from 3.5 volts to 0 volts in 4.3 hours. Current density at 50% polarization is 3.0 mA/cm$^2$. Energy density to 0 volts is 5.44 watt-hours/lb.

EXAMPLE V

Example I is repeated except Nb$_2$O$_5$ is substituted for the WO$_3$. Open circuit potential is 3.94 volts. Upon discharge, voltage drops from 2.65 volts to 0 volts in 13.6 hours. Energy density to 0 volts is 9.3 watt-hours/lb.

EXAMPLE VI

Example I is repeated except AgI is substituted for the WO$_3$. Open circuit potential is 3.57 volts. Upon discharge, voltage drops from 3.4 volts to 0 volts in 1.5 hours. Current density at 50% polarization is 5.5 mA/cm$^2$.

EXAMPLE VII

Example I is repeated except NiO is substituted for the WO$_3$. Open circuit potential is 3.86 volts. Upon discharge, voltage drops slowly from 3.2 volts to 2.85 volts in 3.0 hours and then rapidly to 0.8 volts in 2.0 hours. At 0.8 volts there is a relatively flat discharge for 4.0 hours, then the voltage drops slowly to 0 volts in 6.1 hours. Current density at 50% polarization is 17.5 mA/cm$^2$. Energy density to 0 volts is 13.55 watt-hours/lb.

EXAMPLE VIII

Example I is repeated except Ag$_2$O is substituted for the WO$_3$. Open circuit potential is 3.37 volts. Upon discharge, voltage drops from 3.0 volts to 0 volts in 3.0 hours. Current density at 50% polarization is 5.0 mA/cm$^2$. Energy density is 3.44 watt-hours/lb.

EXAMPLE IX

Example I is repeated except $WS_2$ is substituted for $WO_3$. Open circuit potential is 3.8 volts. Upon discharge voltage dropped from 3.15 volts to 2.5 volts in 5.0 hours, then to 0.5 volts in another 2.0 hours, and finally to 0 volts in another 9.0 hours. Current density at 50% polarization is 7.0 mA/cm$^2$. Energy density to 0 volts is 12.4 watt-hours/lb.

EXAMPLE X

Example I is repeated except $H_{0.5}WO_3$ is substituted for the $WO_3$ of Example I, and the solvent is a 55:45 by volume mixture of $POCl_3$ and $SOCl_2$. Open circuit potential is 3.75 volts. Upon discharge, voltage drops from 3.1 volts to 2.0 volts in 12.0 hours, then to 0 volts in an additional 6 hours. Current density at 50% polarization is 10.0 mA/cm$^2$. Energy density to 0 volts is 26.0 watt-hours/lb.

EXAMPLE XI

Example X is repeated except WC is substituted for the $H_{0.5}WO_3$ for Example X. Open circuit is 3.67 volts. Upon discharge, voltage drops from 3.2 volts to 2.65 volts in 5.0 hours, then to 0 volts in an additional 4.25 hours. Current density at 50% polarization is 7.0 mA/cm$^2$. Energy density to 0 volts is 13.3 watt-hours/lb.

EXAMPLE XII

Example I is repeated except the cathode is a blend of 77% CuS, 11½% graphite and 11½% polytetrafluoroethylene emulsion. Open circuit potential is 3.57 volts which decreases to 3.41 volts after 5 minutes. Cell voltage drops to 3.1 volts after 2 hours, then decreases to a plateau at 1.27 volts. Cell voltage remains above 1 volt for an additional 14 hours, and then drops to 0 volts after 6 more hours.

EXAMPLE XIII

Example I is repeated except the cathode is a blend of 50% and 50% S. Open circuit potential is 3.6 volts. Upon discharge, voltage drops to 0 volts in ½ hour.

EXAMPLE XIV

An electrochemical cell is constructed having a lithium anode, a cathode having cupric sulfide as the active cathode component and an electrolyte comprising a solution of lithium tetrachloroaluminate in a 1:2 (by weight) mixture of phosphorus oxychloride and monofluorophosphoryl dichloride. The cell is operated at about $-30°$ C.

EXAMPLE XV

An electrochemical cell is constructed having lithium anode, a cathode having nickel sulfide as the active cathode component, and an electrolyte comprising a solution of lithium tetrachloroaluminate in a 1:1 (by weight) mixture of phosphorus oxychloride and thionyl chloride. The cell is operated at about $-30°$ C.

EXAMPLE XVI

An electrochemical cell is constructed having a lithium anode, a cathode having cupric sulfide as the active cathode component, and an electrolyte comprising a solution of lithium tetrachloroaluminate in a 1:1 (by weight) mixture of phosphorus oxychloride and sulfuryl chloride. The cell is operated at about $-20°$ C.

EXAMPLE XVII

An electrochemical cell is constructed having a lithium anode, a cathode having $WO_3$ as the active cathode component, and an electrolyte comprising a solution of lithium tetrachloroborate in a 1:1 (by weight) mixture of phosphorus oxychloride and thiophosphoryl chloride. The cell is operated at about $-15°$ C.

While the present invention has been described with reference to specific embodiments thereof, it should be understood by those skilled in this art that various changes may be made and equivalents may be substituted without departing from the true spirit and scope of the invention. In addition, many modifications may be made to adapt a particular situation, material or composition of matter, process, process step or steps, or then-present objective to the spirit of this invention without departing from its essential teachings.

What is claimed is:

1. An electrochemical cell comprising an oxidizable active anode material; an active solid cathode material selected from the group consisting of halogens, metal halides, solid Group VI A elements and compounds thereof with metallic elements; and an electrolyte consisting essentially of an inorganic solvent system and a solute dissolved in said inorganic solvent system, said solvent system consisting essentially of a mixture of phosphorus oxychloride and a low freezing solvent selected from the group consisting of thiophosphoryl chloride, thionyl chloride, sulfuryl chloride, and monofluorophosphoryl dichloride; said inorganic solvent system being the sole solvent material in said electrolyte.

2. The electrochemical cell of claim 1 wherein said active anode material is lithium.

3. The electrochemical cell of claim 1 wherein said active anode material is sodium.

4. The electrochemical cell of claim 1 wherein said active cathode material is a halogen.

5. The electrochemical cell of claim 1 wherein said active cathode material is chlorine.

6. The electrochemical cell of claim 1 wherein said active cathode material is a metal halide.

7. The electrochemical cell of claim 1 wherein said active cathode material is selected from the group consisting of sulfur, selenium, and oxides, sulfides, and selenides of metallic elements.

8. The electrochemical cell of claim 1 wherein said active cathode material is selected from from the group consisting of sulfur and selenium.

9. The electrochemical cell of claim 1 wherein said active cathode material is a metallic oxide.

10. The electrochemical cell of claim 1 wherein said active cathode material is a metallic sulfide.

11. The electrochemical cell of claim 1 wherein said active cathode material is selected from the group consisting of cuprous sulfide, cupric sulfide and nickel sulfide.

12. The electrochemical cell of claim 1 wherein said active cathode material is a metallic selenide.

13. The electrochemical cell of claim 1 wherein said solute provides at least one anion having the formula $X^-$, $MX_4^-$, $M'X_6^-$, $M''X_6^=$, where M is an element selected from the group consisting of aluminum and boron; M' is an element selected from the group consisting of phosphorus, arsenic and antimony; M" is an element selected from the group consisting of tin, zirconium, and titanium; and X is a halogen; said solute further providing at least one cation selected from the group consisting of alkali metals, the alkaline earth metals, the lanthanides, $POCl_2{}^+$, and $R_4N^+$, where R is a radical selected from the group consisting of methyl, ethyl, propyl, isopropyl, butyl and isobutyl.

14. The electrochemical cell of claim 1 wherein said solute includes at least one compound selected from the group consisting of lithium perchlorate, lithium dichlorophosphate, lithium chloride, lithium tetrachloroaluminate, lithium tetrachloroborate, lithium tetrafluoroborate, lithium hexafluorophosphate, lithium hexafluoroarsenate, lithium hexafluoroantimonate, lithium hexachloroantimonate, lithium hexachlorostannate, lithium hexachlorozirconate, lithium hexachlorotitanate and lithium chlorosulfate.

15. The electrochemical cell of claim 1 wherein said solute includes a Lewis acid.

16. The electrochemical cell of claim 1 wherein said solvent system consists essentially of a mixture of phosphorus oxychloride and thionyl chloride.

17. The electrochemical cell of claim 1 wherein said solvent system consists essentially of a mixture of phosphorus oxychloride and sulfuryl chloride.

18. The electrochemical cell of claim 1 wherein said inorganic solvent system consists essentially of a mixture of phosphorus oxychloride and thiophosphoryl chloride.

19. The electrochemical cell of claim 1 wherein said inorganic solvent system consists essentially of a mixture of phorphorus oxychloride and monofluorophosphoryl dichloride.

20. An electrochemical cell comprising an alkali metal anode, a tungsten oxide active cathode material, and an electrolytic solution consisting essentially of at least one solvent selected from the group consisting of the oxyhalides of phosphorus and the oxyhalides of sulfur, and a solute dissolved in said solvent; said solvent being the sole solvent in said electrolyte.

21. The electrochemical cell of claim 20 wherein said tungsten oxide is represented by the formula $WO_2$, $WO_3$ or $H_{0.5}WO_3$.

22. The electrochemical cell of claim 21 wherein said solvent is a mixture of phosphorus oxyhalide and thionyl chloride.

* * * * *